US009207760B1

(12) United States Patent
Wu et al.

(10) Patent No.: US 9,207,760 B1
(45) Date of Patent: Dec. 8, 2015

(54) INPUT DETECTION

(71) Applicant: Google Inc., Mountain View, CA (US)

(72) Inventors: Bo Wu, Alhambra, CA (US); Yong Zhao, San Jose, CA (US); Hartmut Neven, Malibu, CA (US); Hayes Solos Raffle, Palo Alto, CA (US); Thad Eugene Starner, Mountain View, CA (US)

(73) Assignee: Google Inc., Mountain View, CA (US)

( * ) Notice: Subject to any disclaimer, the term of this patent is extended or adjusted under 35 U.S.C. 154(b) by 439 days.

(21) Appl. No.: 13/630,563

(22) Filed: Sep. 28, 2012

(51) Int. Cl.
| | |
|---|---|
| G06F 15/18 | (2006.01) |
| G06N 5/02 | (2006.01) |
| G06N 3/02 | (2006.01) |
| G06F 3/01 | (2006.01) |
| G06K 9/62 | (2006.01) |
| G06K 9/00 | (2006.01) |
| G06N 99/00 | (2010.01) |
| G02B 27/00 | (2006.01) |
| G02B 27/01 | (2006.01) |

(52) U.S. Cl.
CPC ............ *G06F 3/013* (2013.01); *G02B 27/0093* (2013.01); *G06K 9/00281* (2013.01); *G06K 9/00288* (2013.01); *G06K 9/00617* (2013.01); *G06K 9/623* (2013.01); *G06K 9/626* (2013.01); *G06K 9/6231* (2013.01); *G06K 9/6257* (2013.01); *G06K 9/6263* (2013.01); *G06N 99/005* (2013.01); *G02B 2027/0187* (2013.01)

(58) Field of Classification Search
CPC ............ G06K 9/6256; G06K 9/00248; G06K 9/00288; G06K 9/00617; G06K 9/623; G06K 9/6257; G06K 9/626; G06F 3/013; G06N 99/005; G02B 2027/0187; G02B 27/0093

USPC ................ 706/12, 20, 48; 382/117, 159, 218; 345/8

See application file for complete search history.

(56) References Cited

U.S. PATENT DOCUMENTS

| | | | |
|---|---|---|---|
| 5,621,424 A * | 4/1997 | Shimada et al. | ................... 345/8 |
| 5,726,916 A | 3/1998 | Smyth | |
| 6,381,339 B1 * | 4/2002 | Brown et al. | ................. 382/100 |

(Continued)

OTHER PUBLICATIONS

P. A. Viola, M. J. Jones, Robust realtime face detection, International Journal of Computer Vision, vol. 57, No. 2, pp. 137-154, 2004.*

(Continued)

*Primary Examiner* — Michael J Eurice
(74) *Attorney, Agent, or Firm* — McDonnell Boehnen Hulbert & Berghoff LLP

(57) ABSTRACT

This disclosure involves proximity sensing of eye gestures using a machine-learned model. An illustrative method comprises receiving training data that includes proximity-sensor data. The data is generated by at least one proximity sensor of a head-mountable device (HMD). The data is indicative of light received by the proximity sensor(s). The light is received by the proximity sensor(s) after a reflection of the light from an eye area. The reflection occurs while an eye gesture is being performed at the eye area. The light is generated by at least one light source of the HMD. The method further comprises applying a machine-learning process to the training data to generate at least one classifier for the eye gesture. The method further comprises generating an eye-gesture model that includes the at least one classifier for the eye gesture. The model is applicable to subsequent proximity-sensor data for detection of the eye gesture.

20 Claims, 13 Drawing Sheets

(56) References Cited

U.S. PATENT DOCUMENTS

| | | | |
|---|---|---|---|
| 6,559,770 B1* | 5/2003 | Zoerb | 340/575 |
| 7,553,021 B2 | 6/2009 | Fergason et al. | |
| 8,885,882 B1* | 11/2014 | Yin et al. | 382/103 |
| 2002/0113755 A1* | 8/2002 | Lee | 345/7 |
| 2003/0012425 A1* | 1/2003 | Suzuki et al. | 382/154 |
| 2003/0110147 A1* | 6/2003 | Li et al. | 706/1 |
| 2009/0018980 A1* | 1/2009 | Zhang et al. | 706/12 |
| 2009/0018981 A1* | 1/2009 | Zhang et al. | 706/12 |
| 2009/0074259 A1* | 3/2009 | Baltatu et al. | 382/118 |
| 2009/0210362 A1* | 8/2009 | Xiao et al. | 706/12 |
| 2009/0287620 A1* | 11/2009 | Xu | 706/12 |
| 2009/0324060 A1* | 12/2009 | Sato et al. | 382/159 |
| 2010/0110368 A1* | 5/2010 | Chaum | 351/158 |
| 2010/0149073 A1* | 6/2010 | Chaum et al. | 345/8 |
| 2010/0207762 A1* | 8/2010 | Lee et al. | 340/541 |
| 2011/0007174 A1* | 1/2011 | Bacivarov et al. | 348/222.1 |
| 2011/0010317 A1* | 1/2011 | Ito et al. | 706/12 |
| 2011/0077548 A1* | 3/2011 | Torch | 600/558 |
| 2012/0194418 A1* | 8/2012 | Osterhout et al. | 345/156 |
| 2012/0194550 A1* | 8/2012 | Osterhout et al. | 345/633 |
| 2012/0194553 A1* | 8/2012 | Osterhout et al. | 345/633 |
| 2012/0314017 A1* | 12/2012 | Gross | 348/14.07 |
| 2013/0265241 A1* | 10/2013 | Thorn | 345/173 |

OTHER PUBLICATIONS

Bradski, et al., Learning-based computer vision with intel's open source computer vision library, Intel Technology Journal, vol. 9, No. 2, pp. 119-130, May 2005.*

Viola, Paul, et al., Robust Real-Time Face Detection, International Journal of Computer Vision, vol. 57, No. 2, Kluwer Academic Publishers 2004.*

Grauman, Kristen, et al., Communication via Eye Blinks—Detection and Duration Analysis in Real Time, IEEE, 2001.

Krolak, Aleksandra, et al., Eye-blink Detection System for Human-Computer Interaction, Univ Access Inf Soc, Oct. 2, 2011, Springer.

\* cited by examiner

INPUT DETECTION

BACKGROUND

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's eye(s) such that the displayed image fills or nearly fills the field of view, and appears as a normal sized image, such as might be displayed on a traditional image display device. The relevant technology may be referred to as "near-eye displays."

Near-eye displays are fundamental components of wearable displays, also sometimes called "head-mountable displays" (HMDs). A head-mountable display places a graphic display or displays close to one or both eyes of a wearer. To generate the images on a display, a computer processing system can be used. Such displays can occupy a wearer's entire field of view, or occupy part of wearer's field of view. Further, head-mountable displays can be as small as a pair of glasses or as large as a helmet.

Emerging and anticipated uses of wearable displays include applications in which users interact in real time with an augmented or virtual reality. Such applications can be mission-critical or safety-critical, such as in a public safety or aviation setting. Nonetheless, often users must carry out complex and/or burdensome input procedures to perform desired computing functions. As a result, known methods for performing computing functions are often considered inconvenient, inefficient, and/or non-intuitive.

SUMMARY

An aspect of this disclosure involves a first method. The first method comprises receiving training data that includes proximity-sensor data. The proximity-sensor data is generated by at least one proximity sensor of a head-mountable device (HMD). The proximity-sensor data is indicative of light received by the at least one proximity sensor. The light is received by the at least one proximity sensor after a reflection of the light from an eye area. The reflection occurs while an eye gesture is being performed at the eye area. The light is generated by at least one light source of the HMD. The first method further comprises applying a machine-learning process to the training data to generate at least one classifier for the eye gesture. The first method further comprises generating an eye-gesture model that includes the at least one classifier for the eye gesture. The eye-gesture model is applicable to subsequent proximity-sensor data for detection of the eye gesture.

Another aspect of this disclosure involves a non-transitory computer-readable medium. The medium has stored thereon program instructions. The program instructions, upon execution by a computing device, cause the computing device to perform functions, such as, for example, the functions discussed above in connection with the first method.

Another aspect of this disclosure involves a second method. The second method comprises receiving proximity-sensor data that is indicative of light received by at least one proximity sensor of an HMD. The light is received after a reflection of the light from an eye area. The reflection occurs while an eye gesture is being performed at the eye area. The light is generated by at least one light source of the HMD. The second method further comprises applying an eye-gesture model to the proximity-sensor data such that at least one classifier of the eye-gesture model determines whether the proximity-sensor data is representative of the eye gesture. The second method further comprises causing the HMD to perform a computing action, in response to the at least one classifier of the eye-gesture model determining that the proximity-sensor data is representative of the eye gesture.

Another aspect of this disclosure involves an HMD system. The HMD system comprises a proximity-sensor system. The proximity-sensor system is configured to generate proximity-sensor data. The proximity-sensor data is indicative of light received by at least one proximity sensor of an HMD. The light is received by the at least one proximity sensor after a reflection of the light from an eye area. The reflection occurs while an eye gesture is being performed at the eye area. The light is generated by at least one light source of the HMD. The HMD system further comprises a computer-readable medium having stored thereon program instructions. The program instructions, upon execution by a computing device, cause the computing device to perform functions. The functions comprise applying an eye-gesture model to the proximity-sensor data such that at least one classifier of the eye-gesture model determines whether the proximity-sensor data is representative of the eye gesture. The functions further comprise causing the HMD to perform a computing action, in response to the at least one classifier of the eye-gesture model determining that the proximity-sensor data is representative of the eye gesture.

DETAILED DESCRIPTION

I. Overview

Figure 1A:
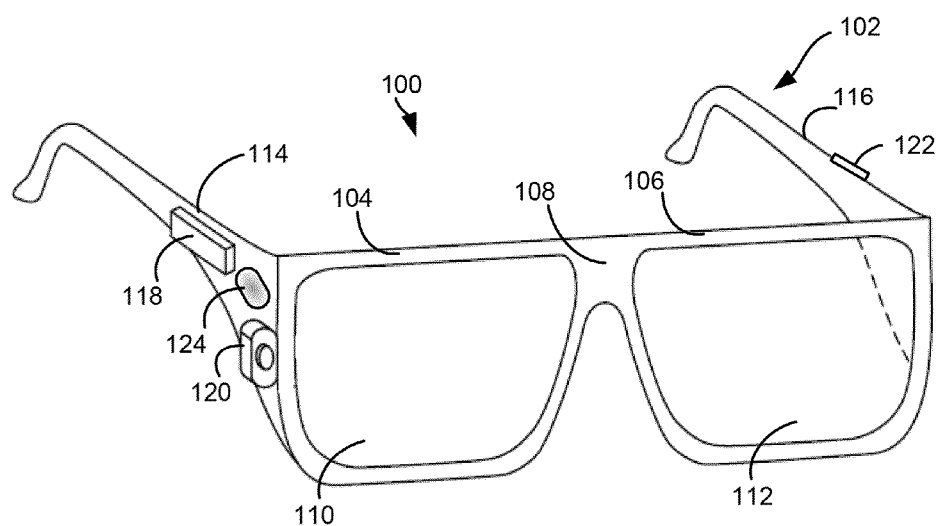
FIGS. 1A-1D illustrate examples of wearable computing systems.

An aspect of this disclosure involves generating an eye-gesture model, which is usable for detecting an eye gesture of a wearer of a head-mountable device (HMD), such as an eyeglasses-style wearable computer.

Generating the eye-gesture model involves acquiring data with the use of at least one HMD that is capable of performing proximity sensing. To this end, the HMD has a light-generating system and a proximity-sensing system, which has at least one proximity sensor. In operation, when the HMD is worn, the light-generating system can provide light to an eye area of the HMD's wearer, and the proximity sensor can receive light that is reflected from the eye area. In response to receiving light, the proximity sensor generates data that is indicative of the received light.

Assume that an eye gesture is performed at the eye area when the light is reflected from the eye area. The eye gesture can involve a movement of the wearer's eye, of some skin near the eye, or of both. This movement can modify the light-scattering characteristics of the eye area while the eye gesture is occurring. In other words, the movement resulting from the eye gesture can change the way that light is reflected from the eye area. Some eye gestures can cause light to be reflected toward the proximity sensor in a relatively predictable manner. Assuming that the eye gesture in discussion has this effect, when the proximity sensor receives the reflected light, the proximity sensor generates a relatively unique data pattern, at least in a portion that corresponds to the eye gesture. For example, light reflected from an eye area during a wink gesture tends to translate into a peak-like pattern in the resulting proximity-sensor data.

Once generated, the proximity-sensor data is provided to a system. In an implementation, the system also receives proximity-sensor data generated at one or more other HMDs. The system pre-processes the received proximity-sensor data and provides it in the form of training data to an eye-gesture model generator. The eye-gesture model generator applies to the training data a machine-learning process, such as a boosting process that operates in connection with several weak classifiers. This generates a classifier for the eye gesture. In an implementation, the generated classifier is a strong classifier that contains a linear-weighted combination of weak classifiers.

The system generates an eye-gesture model that contains the classifier for the eye gesture. In an implementation, the eye-gesture model has a classifier cascade, which contains multiple strong classifiers, with each strong classifier containing a linear-weighted combination of weak classifiers. The eye-gesture model can be used to determine whether subsequently received proximity-sensor data is representative of the eye gesture.

Another aspect of this disclosure involves using an eye-gesture model to detect an eye gesture of a wearer of an HMD. To this end, a system receives proximity-sensor data, which can be of the type discussed above. The system applies an eye-gesture model to the proximity-sensor data such that a classifier or set of classifiers of the eye-gesture model determines whether the proximity-sensor data is representative of the eye gesture. If it is so determined, then the system causes the HMD to perform a computing action.

II. Head-Mountable Devices

FIG. 1A illustrates an example of a wearable computing system 100. The wearable computing system 100 includes a proximity-sensing system 136 and an image-capturing system 120. While FIG. 1A illustrates a head-mountable device (HMD) 102 as an example of a wearable computing system, other types of wearable computing systems could be used. As illustrated in FIG. 1A, the HMD 102 includes frame elements, including lens frames 104, 106 and a center frame support 108, lens elements 110, 112, and extending side arms 114, 116. The center frame support 108 and the extending side arms 114, 116 are configured to secure the HMD 102 to a user's face via a user's nose and ears.

Each of the frame elements 104, 106, and 108 and the extending side arms 114, 116 can be formed of a solid structure of plastic and/or metal, or can be formed of a hollow structure of similar material so as to allow wiring and component interconnects to be internally routed through the HMD 102. Other materials can be used as well.

The lens elements 110, 112 can be formed of any material that can suitably display a projected image or graphic. Each of the lens elements 110, 112 can also be sufficiently transparent to allow a user to see through the lens element. Combining these two features of the lens elements can facilitate an augmented reality or heads-up display where the projected image or graphic is superimposed over a real-world view as perceived by the user through the lens elements.

The extending side arms 114, 116 can each be projections that extend away from the lens frames 104, 106, respectively, and can be positioned behind a user's ears to secure the HMD 102 to the user. The extending side arms 114, 116 can further secure the HMD 102 to the user by extending around a rear portion of the user's head. The wearable computing system 100 can also or instead connect to or be affixed within a head-mountable helmet structure.

The HMD 102 can include an on-board computing system 118, a video camera 120, a sensor 122, and a finger-operable touch pad 124. The on-board computing system 118 is shown to be positioned on the extending side arm 114 of the HMD 102. The on-board computing system 118 can be provided on other parts of the HMD 102 or can be positioned remote from the HMD 102. For example, the on-board computing system 118 could be wire- or wirelessly-connected to the HMD 102. The on-board computing system 118 can include a processor and memory, for example. The on-board computing system 118 can be configured to receive and analyze data from the video camera 120 and the finger-operable touch pad 124 (and possibly from other sensory devices, user interfaces, or both) and generate images for output by the lens elements 110 and 112. The on-board computing system can take the form of the computing device 1100 that is discussed below in section (VIII).

With continued reference to FIG. 1A, the video camera 120 is shown positioned on the extending side arm 114 of the HMD 102; however, the video camera 120 can be provided on other parts of the HMD 102. The video camera 120 can be configured to capture image data at various resolutions or at different frame rates. One or multiple video cameras with a small form factor, such as those used in cell phones or webcams, for example, can be incorporated into the HMD 102.

Further, although FIG. 1A illustrates one video camera 120, more video cameras can be used, and each can be configured to capture the same view, or to capture different views. For example, the video camera 120 can be forward facing to capture at least a portion of the real-world view perceived by the user. The image data captured by the video camera 120 can then be used to generate an augmented reality where computer generated images appear to interact with the real-world view perceived by the user.

The sensor 122 is shown on the extending side arm 116 of the HMD 102; however, the sensor 122 can be positioned on other parts of the HMD 102. The sensor 122 can include one or more of a gyroscope, an accelerometer, or a proximity sensor, for example. Other sensing devices can be included within, or in addition to, the sensor 122 or other sensing functions can be performed by the sensor 122.

The finger-operable touch pad 124 is shown on the extending side arm 114 of the HMD 102. However, the finger-operable touch pad 124 can be positioned on other parts of the HMD 102. Also, more than one finger-operable touch pad can be present on the HMD 102. The finger-operable touch pad 124 can be used by a user to input commands. The finger-operable touch pad 124 can sense at least one of a position and a movement of a finger via capacitive sensing, resistance sensing, or a surface acoustic wave process, among other possibilities. The finger-operable touch pad 124 can be capable of sensing finger movement in a direction parallel or planar to the pad surface, in a direction normal to the pad surface, or both, and can also be capable of sensing a level of pressure applied to the pad surface. The finger-operable touch pad 124 can be formed of one or more translucent or transparent insulating layers and one or more translucent or transparent conducting layers. Edges of the finger-operable touch pad 124 can be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad can be operated independently, and can provide a different function.

Figure 1B:
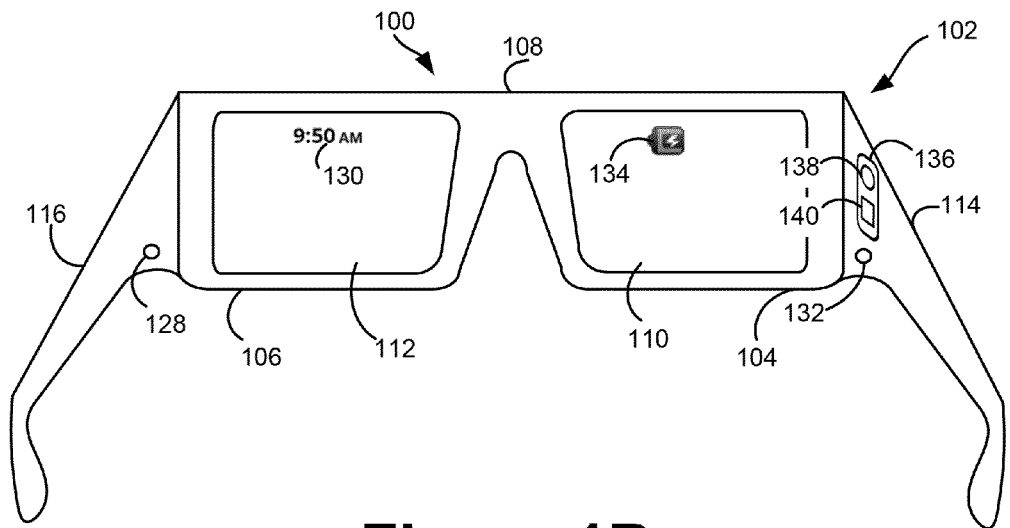

FIG. 1B illustrates an alternate view of the wearable computing system 100 illustrated in FIG. 1A. As shown in FIG. 1B, the lens elements 110, 112 can act as display elements. The HMD 102 can include a first projector 128 coupled to an inside surface of the extending side arm 116 and configured to project a display 130 onto an inside surface of the lens element 112. A second projector 132 can be coupled to an inside surface of the extending side arm 114 and can be configured to project a display 134 onto an inside surface of the lens element 110.

The lens elements 110, 112 can act as a combiner in a light projection system and can include a coating that reflects the light projected onto them from the projectors 128, 132. In some embodiments, a reflective coating may not be used (such as, for example, when the projectors 128, 132 are scanning laser devices).

In some embodiments, other types of display elements can also be used. For example, the lens elements 110, 112 themselves can include one or more transparent or semi-transparent matrix displays (such as an electroluminescent display or a liquid crystal display), one or more waveguides for delivering an image to the user's eyes, or one or more other optical elements capable of delivering an in focus near-to-eye image to the user. A corresponding display driver can be disposed within the frame elements 104, 106 for driving such a matrix display. Alternatively or additionally, a laser or LED source and scanning system could be used to draw a raster display directly onto the retina of one or more of the user's eyes.

The proximity-sensing system 136 includes a light source 138 and a light sensor 140 affixed to the extending side arm 114 of the HMD 102. The proximity-sensing system 136 can include elements other than those shown in FIG. 1B. Additionally, the proximity-sensing system 136 can be arranged in other ways. For example, the light source 138 can be mounted separately from the light sensor 140. As another example, the proximity-sensing system 136 can be mounted to other frame elements of the HMD 102, such as, for example, to the lens frames 104 or 106, to the center frame support 108, or to the extending side arm 116.

Figure 1C:
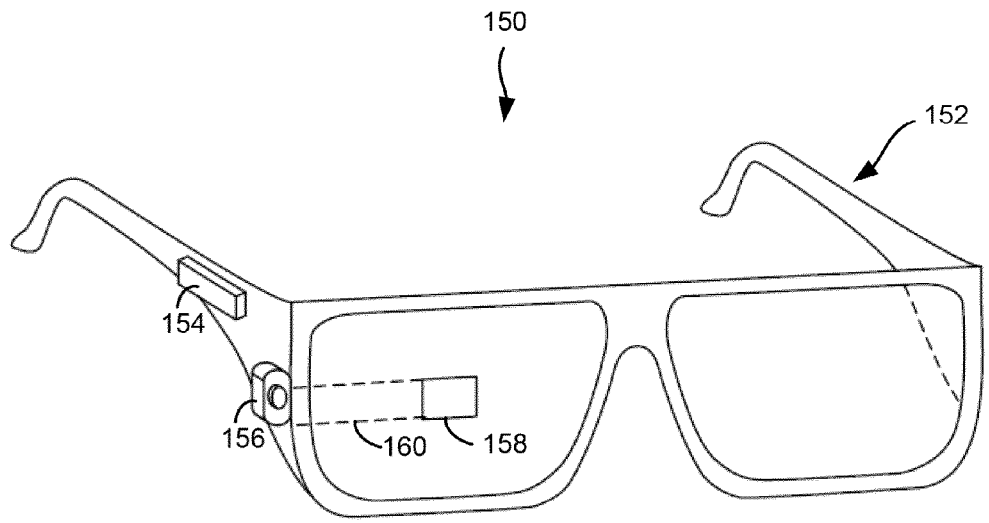

FIG. 1C illustrates another example of a wearable computing system 150. The wearable computing system 150 includes an image-capturing system 156. The wearable computing system 150 can be coupled to a proximity-sensing system, although a proximity-sensing system is not shown in FIG. 1C. While FIG. 1C illustrates an HMD 152 as an example of a wearable computing system, other types of wearable computing systems could be used. The HMD 152 can include frame elements and side arms such as those discussed above in connection with FIGS. 1A and 1B. The HMD 152 can also include an on-board computing system 154 and a video camera 156, such as those discussed above in connection with FIGS. 1A and 1B. The video camera 156 is shown to be mounted on a frame of the HMD 152; however, the video camera 156 can be mounted at other positions as well.

As shown in FIG. 1C, the HMD 152 can include a single display 158, which can be coupled to the HMD. The display 158 can be formed on one of the lens elements of the HMD 152, such as a lens element having a configuration as discussed above in connection with FIGS. 1A and 1B. The display 158 can be configured to overlay computer-generated graphics in the user's view of the physical world. The display 158 is shown to be provided in a center of a lens of the HMD 152; however, the display 158 can be provided in other positions. The display 158 is controllable via the computing system 154, which is coupled to the display 158 via an optical waveguide 160.

Figure 1D:
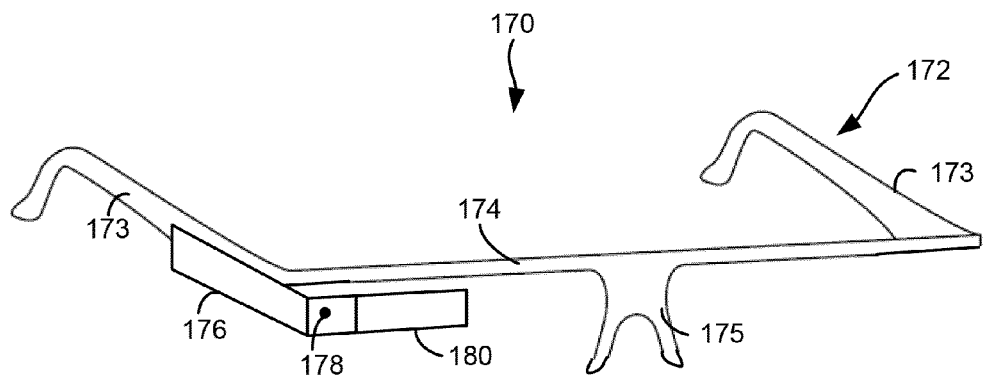

FIG. 1D illustrates another example of a wearable computing system 170. The wearable computing system 170 can include an image-capturing system 178 and a proximity-sensing system (not shown in FIG. 1D). The wearable computing system 170 is shown in the form of an HMD 172; however, the wearable computing system 170 can take other forms as well. The HMD 172 can include side arms 173, a center frame support 174, and a bridge portion with a nosepiece 175. In the example shown in FIG. 1D, the center frame support 174 connects the side arms 173. The HMD 172 does not include lens-frames containing lens elements. The HMD 172 can also include an on-board computing system 176 and a video camera 178, such as those discussed above in connection with FIGS. 1A and 1B.

The HMD 172 can include a single lens element 180, which can be coupled to one of the side arms 173 or to the center frame support 174. The lens element 180 can include a display, such as the display discussed above in connection with FIGS. 1A and 1B. The lens element 180 can be configured to overlay computer-generated graphics upon the user's view of the physical world. In an example, the single lens element 180 can be coupled to the inner side (the side exposed to a portion of a user's head when worn by the user) of the extending side arm 173. The single lens element 180 can be positioned in front of or proximate to a user's eye when the user wears the HMD 172. For example, the single lens element 180 can be positioned below the center frame support 174, as shown in FIG. 1D.

III. Proximity-Sensing System

Figure 2:
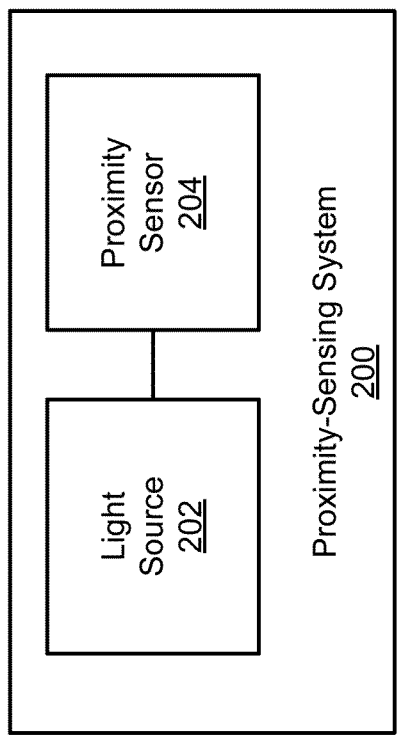
FIG. 2 illustrates an example of a proximity-sensing system.

FIG. 2 illustrates a proximity-sensing system 200. The proximity-sensing system 200 includes a light source 202 and a proximity sensor 204. The light source 202 and the proximity sensor 204 can be connected to an HMD, such as one of the HMDs discussed above in section (I).

For ease of explanation, FIG. 2 shows a single light source and a single proximity sensor; the proximity-sensing system 200 can include more than one light source and more than one proximity sensor. In the proximity-sensing system 200, each of the light sources and proximity sensors can be arranged in any suitable manner so long as the proximity-sensing system is able to accomplish the disclosed functionality.

In operation, when the HMD is worn, the light source 202 provides light to an eye area of the HMD's wearer. The proximity sensor 204 receives light that is reflected from the eye area and, in response, generates data that represents a measurable change corresponding to a change in a characteristic of the received light.

The term "eye area," as used in this disclosure, refers to an observable area of a human eye, an observable area near the eye, or both. To this end, the eye area can include a peripheral eye area, an interior eye area, an area near the eye, or a combination of these. Examples of peripheral eye areas include the eye's sclera, cornea, and limbus. An example of an interior area of the eye is the eye's iris. And examples of areas near the eye include the eyelids, other skin near the eye, and eyelashes.

The term "reflected," as used in this disclosure in connection with an eye area, refers to a variety of interactions between light and the eye area, including those interactions that direct the light away from the eye area. Example of such interactions include mirror reflection, diffuse reflection, and refraction, among other light scattering processes.

Section (III)(A) below discusses the structure and functions of the light source 202 in more detail. Section (III)(B) discusses the structure and functions of the proximity sensor 204 in more detail. And section (III)(C) discusses an example of an arrangement of a proximity-sensing system.

A. Light Source

The light source 202 can include any suitable device or combination of devices that is capable of providing light. To this end, the light source 202 can include one or more devices such as a light emitting diode, a laser diode, an incandescent source, a gas discharge source, or a combination of these, among others.

In operation, the light source 202 can emit any suitable form of light. The light can be in the human visible range or outside that range. For example, the light can be near-infrared light. Note that infrared light and other forms of light outside the human visible range can be transmitted to an eye area of an HMD's wearer without potentially irritating the HMD's wearer. For ease of explanation, several examples in this disclosure discuss light in the infrared range.

The light source 202 can provide light to an entire eye area or to a portion of the eye area. The size of the eye area to which the light source 202 provides light is termed the "spot size." For example, the light source 202 can provide light such that the spot size covers at least a portion of the upper eyelid both when the eye is in an open state and when it is in a closed state. As another example, the light source 202 can provide light such that the spot size covers at least a portion of the eye's cornea when the eye is oriented in a forward-facing direction, and such that the spot size covers at least a portion of the eye's sclera when the eye is oriented in another direction.

When the proximity-sensing system 200 includes multiple light sources, the light sources can differ in the spot sizes of the light they provide. For example, one light source can provide light with a spot size that covers the entire eye area, whereas another light source can provide light with a spot size that covers just a portion of the eye area. In other words, one light source can provide light to the entire eye area, and another light source can provide light to a portion of the eye area.

In an implementation, the light source 202 can use modulated or pulsed light. Doing so can help to distinguish light provided by the light source 202 not only from ambient light, but also from light provided by another light source (when there are multiple light sources). Note that the light source 202 can use another light characteristic to distinguish the light it emits from other types of light; examples of light characteristics include frequency and light intensity.

B. Proximity Sensor

The proximity sensor 204 can include any suitable device or combination of devices that is capable of receiving light and, in response, generating data that represents a measurable change corresponding to a change in a characteristic of the received light. To this end, the proximity sensor 204 can include one or more devices such as a photodiode, an electro-optical sensor, a fiber-optic sensor, a photo-detector, or a combination of these, among others.

The proximity sensor 204 can be positioned in a way that permits it to detect light that is reflected from certain portions of an eye area. For example, the proximity sensor 204 can be positioned above an eye. So positioned, the proximity sensor 204 can detect light that is reflected from the top of the eye when the eye is open, and can detect light that is reflected from the top eyelid when the eye is closed. As another example, the proximity sensor 204 can be positioned at an oblique angle with respect to the eye area. For instance, the proximity sensor 204 can be positioned similar to the sensor 140 shown in FIG. 1B. As another example, the proximity sensor 204 can be positioned so that it can focus on the center of the eye area.

In operation, when the proximity sensor 204 receives light, the proximity sensor 204 can generate data that is indicative of the received light. In an implementation, the data represents intensity of the received light as a function of time. The proximity sensor 204 can generate data that represents another characteristic of the received light. For example, the data can represent characteristics of the received light such as frequency, polarization, coherence, phase, spectral width, modulation, or a combination of these, among other characteristics.

When the proximity-sensing system 200 includes multiple light sources, the generated data can take various forms. For example, the proximity sensor 204 or another system can combine received light from all of the light sources in a way that a single curve represents the combined light. As another example, the generated data from the proximity sensor 204 can include separate data sets, with each data set representing light from a separate light source.

Like the light source 202, the proximity sensor 204 can operate in connection with any suitable form of light, whether that light is in the human visible range or outside that range. In addition, the proximity sensor 204 or another system can perform calibrations based on the received light. For example, when the light source 202 and the proximity sensor 204 operate on a common frequency range of light, such as infrared light, the proximity sensor 204 or another system can filter out light that is not in that range. This can reduce noise in the data that the proximity sensor 204 generates. As another example, when the proximity sensor 204 receives light with relatively low intensity levels, the proximity sensor 204 or another system can adjust the sensitivity of the proximity sensor 204.

The proximity sensor 204 can operate in connection with light frequencies and intensities in various ways. In an implementation, the proximity sensor 204 operates on a specified range of frequencies or intensities to the exclusion of frequencies or intensities that are outside that range. In another implementation, the proximity sensor 204 has a granularity that is higher for a specified range of frequencies or intensities than for frequencies or intensities that are outside that range.

Of course, when the light source 202 uses modulated or pulsed light, the proximity sensor 204 not only can receive the modulated or pulsed light, but also can distinguish the modulated or pulsed light from other types of light.

C. Arrangement of a Proximity-Sensing System

Figure 3:
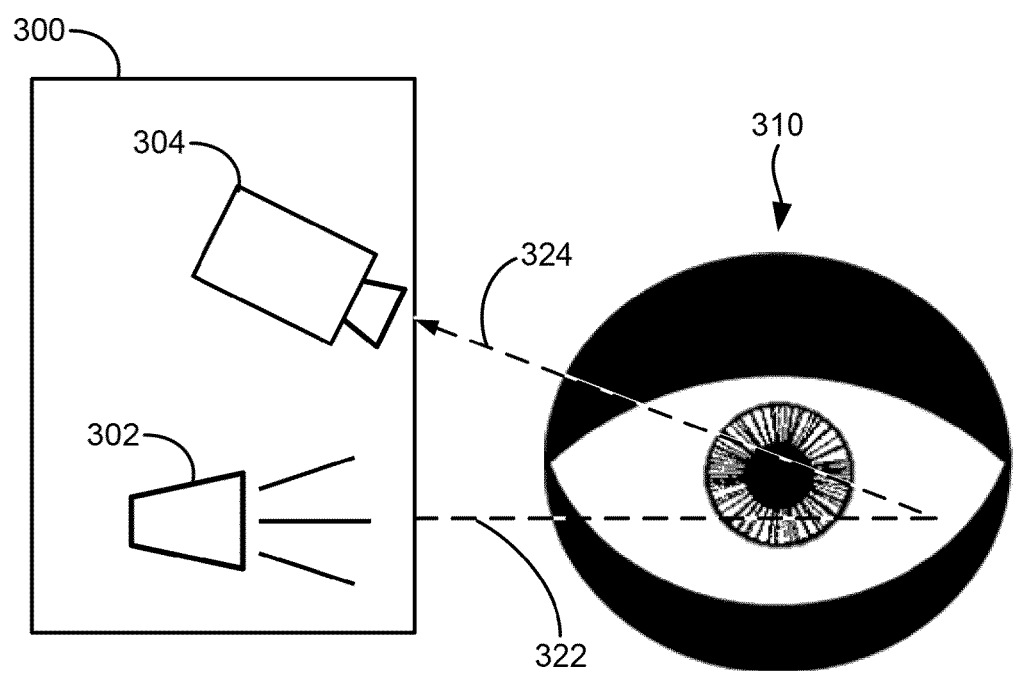
FIG. 3 illustrates an example of an arrangement of a proximity-sensing system.

FIG. 3 illustrates an example of an arrangement of a proximity-sensing system, in which a proximity-sensing system 300 interacts with an eye area 310 while an eye is open.

The proximity-sensing system 300 includes a light source 302 and a proximity sensor 304. The light source 302 is aimed at the sclera of the eye.

In operation, the light source 302 provides light to the sclera or to a larger portion of the eye area 310. The light that is provided to the eye area 310 is indicated by reference numeral 322. The proximity sensor 304 receives light that is reflected from the eye area 310; the reflected light can include some or all of the light from the light source 302. The light that is reflected from the eye area 310 is indicated by reference numeral 324.

For ease of explanation, FIG. 3 shows a single light source and a single proximity sensor merely. Note that the proximity sensing system 300 can have multiple light sources and multiple proximity sensors. In the proximity-sensing system 300, each of the light sources and proximity sensors can be arranged in any suitable manner so long as the proximity-sensing system 300 is able to accomplish the disclosed functionality.

IV. General Principles

The proximity-sensing arrangements discussed above involve detecting light that is reflected from an eye area of a wearer of an HMD. In general, when light is reflected from an eye area, its intensity depends on light-scattering characteristics of the eye area.

As a general observation, light-scattering characteristics of human skin (such as an eyelid) tend to be different from light-scattering characteristics of eye tissues (such as tissues of a cornea). Therefore, intensities of light reflected from skin tend to be higher than intensities of light reflected from an eye. As another general observation, the flatness of skin tends to affect the skin's light-scattering characteristics. In particular, intensities of light reflected from an area with wrinkled skin tend to be higher than intensities of light reflected from an area with relatively flat skin.

With these general observations in mind, assume that light is reflected from an eye area while an eye gesture is being performed. The intensities of the reflected light over time can form a light pattern that represents the type of eye gesture. To illustrate this concept, section (IV)(A) below discusses an example of a light pattern of a blink gesture, section (IV)(B) discusses an example of a light pattern of a wink gesture, and section (IV)(C) discusses an example of a light pattern of a change in vertical gaze direction.

A. Blink Gesture

Figure 4A:
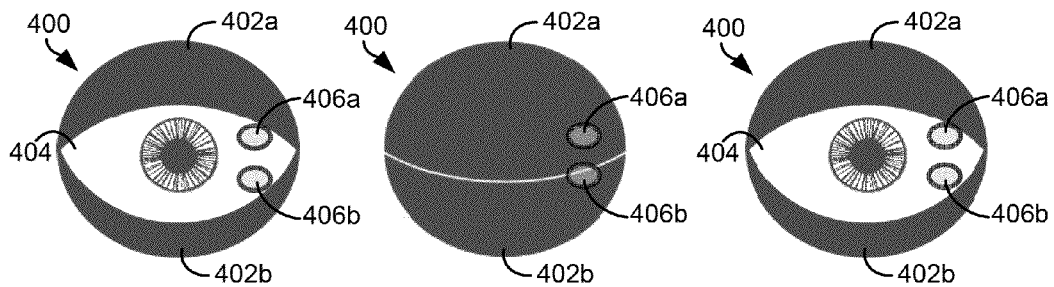
FIG. 4A illustrates a blink gesture of an eye area.

FIG. 4A illustrates a blink gesture of an eye area 400. The left portion of FIG. 4A shows the eye area 400 in an open state, the center portion shows the eye area 400 in a closed blink state, and the right portion shows the eye area 400 again in the open state. Note that when the eye area 400 is in the closed blink state, the skin of the eyelids 402a-402b tends to be relatively flat.

Assume that a proximity-sensing system focuses on areas 406a-406b of the eye area 400 such that light it emits is reflected from the areas 406a-406b. Thus, when the eye area 400 is in the open state, the areas 406a-406b correspond to a surface of the eye 404, whereas when the eye area 400 is in the closed blink state, the areas 406a-406b correspond to the eyelids 402a-402b.

Thus, when the eye area 400 is in the open state, the intensity of light reflected from the areas 406a-406b tends to be relatively low (because the light is reflected from an eye tissue, as opposed to skin), whereas when the eye area 400 is in the closed blink state, the intensity of light reflected from the areas 406a-406b tends to be relatively high (because the light is reflected from skin) These light intensities form a light pattern that can represent the blink gesture. In the example discussed above, the light pattern of the blink gesture is characterized by light that has a relatively low intensity, followed by light that has a relatively high intensity, followed by light that has a relatively low intensity.

B. Wink Gesture

Figure 4B:
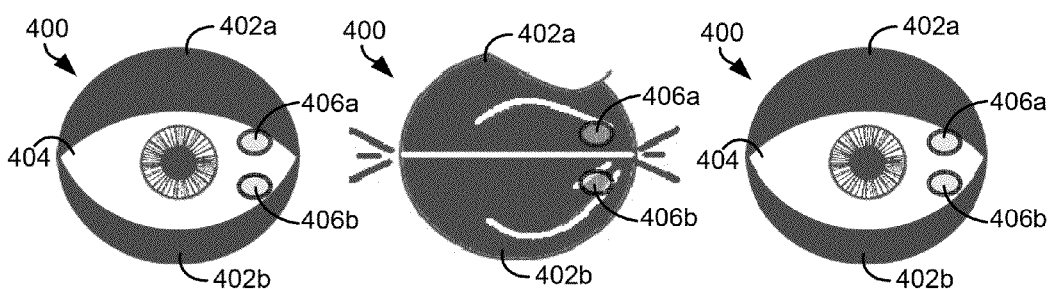
FIG. 4B illustrates a wink gesture of the eye area.

FIG. 4B illustrates a wink gesture of the eye area 400. The left portion of FIG. 4B shows the eye area 400 in an open state, the center portion shows the eye area 400 in a closed wink state, and the right portion shows the eye area 400 in the open state. Note that when the eye area 400 is in the closed wink state, the skin of the eyelids 402a-402b tends to have more wrinkles than it does in the closed blink state, making the skin less flat in the closed wink state than it is in the closed blink state.

Assume that a proximity-sensing system focuses on the same areas 406a-406b that are discussed above in connection with FIG. 4A, such that light the proximity-sensing system emits is reflected from the areas 406a-406b. Thus, when the eye area 400 is in the open state, the areas 406a-406b correspond to a tissue of the eye 404, whereas when the eye area 400 is in the closed wink state, the areas 406a-406b correspond to the eyelids 402a-402b.

Thus, when the eye area 400 is in the open state, the intensity of light reflected from the areas 406a-406b tends to be relatively low (as in the open state of the blink gesture), whereas when the eye area 400 is in the closed wink state, the intensity of light reflected from the areas 406a-406b tends to be relatively high. And the light intensity in the closed wink state tends to be higher than the light intensity in the closed blink state, because the eyelids 402a-402b have more wrinkles in the closed wink state than they do in the closed blink state.

These intensities form a light pattern that can represent the wink gesture. In the example discussed above, the light pattern of the wink gesture is characterized by light that has a relatively low intensity, followed by light that has a higher intensity than it would in the closed blink state, followed by light that has a relatively low intensity.

C. Change in Vertical Gaze Direction

Figure 4C:
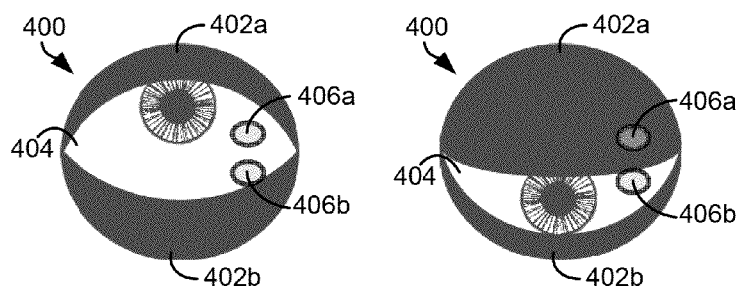
FIG. 4C illustrates a change in vertical gaze direction of the eye area.

FIG. 4C illustrates a change in vertical gaze direction of the eye area 400. The left portion of FIG. 4C shows the eye area 400 in an upward-looking state, and the right portion shows the eye area 400 in a downward-looking state. Note that when the eye area 400 is in the downward-looking state, the upper eyelid 402a is in a lower position than it is in the upward-looking state.

Assume that a proximity-sensing system focuses on the same areas 406a-406b that are discussed above in connection with FIGS. 4A-4B, such that light the proximity-sensing system provides is reflected from the areas 406a-406b. Thus, when the eye area 400 is in the upward-looking state, the areas 406a-406b correspond to a surface of the eye 404, whereas when the eye area 400 is in the downward-looking state, the area 406a corresponds to the upper eyelid 402a and the area 406b corresponds to a tissue of the eye.

Thus, when the eye area 400 is in the upward-looking state, the intensity of light reflected from the areas 406a-406b tends to be relatively low (as in the open state of the blink and wink gestures), whereas when the eye area 400 is in the downward-looking state, the intensity of light reflected from the area 406a tends to be relatively high and the intensity of light reflected from the area 406b tends to be relatively low. These light intensities form a light pattern that can represent the downward shift in vertical gaze. In the example discussed above, the light pattern of the downward shift in vertical gaze includes relatively low light intensities for two eye areas, followed by a relatively high light intensity for one eye area and a relatively low light intensity for another eye area.

V. Eye Gesture Model Generator

Figure 5:
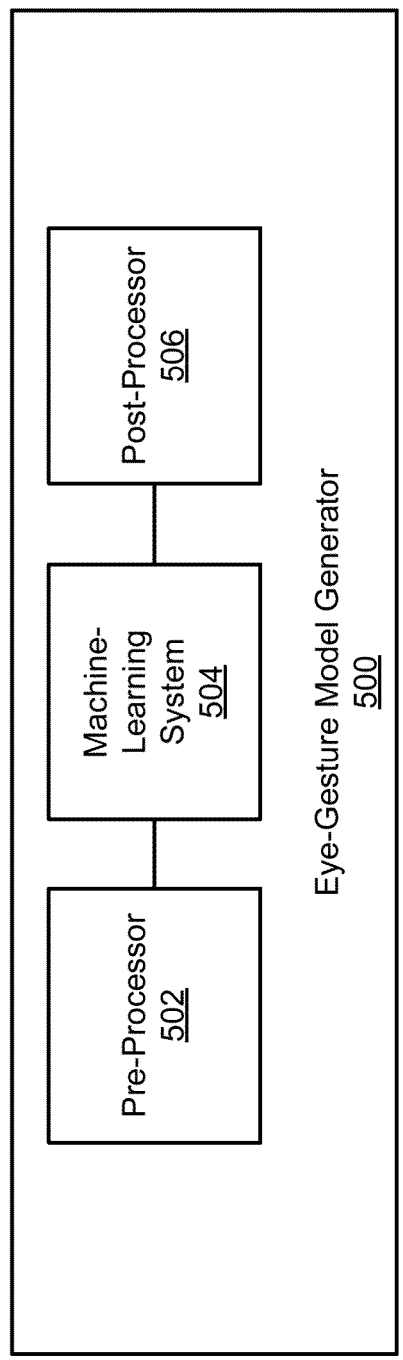
FIG. 5 illustrates an example of an eye-gesture model generator.

FIG. 5 illustrates an eye-gesture model generator (or simply "generator") 500. The generator 500 includes a pre-processor 502, a machine-learning system 504, and a post-processor 506. In an implementation, the generator 500 is part of a computing system that is separate from an HMD. In another implementation, the generator 500 is part of a computing system of the HMD.

For ease of explanation, FIG. 5 shows a single pre-processor, machine-learning system, and post-processor. Note that the generator 500 can have more than one pre-processor, machine-learning system, or post-processor.

In operation, the generator 500 generates an eye-gesture model from training data. To this end, the training data can be pre-processed by the pre-processor 502 and transmitted to the machine-learning system 504. The machine-learning system 504 uses the processed training data to generate an eye-gesture model. In an implementation, the machine-learning system 504 transmits the eye-gesture model to the post-processor 506, which further processes the eye-gesture model 506 as desired.

Section (V)(A) below discusses functions of the pre-processor 502 in more detail. Section (V)(B) discusses functions of the machine-learning system 504 in more detail. And section (V)(C) discusses functions of the post-processor 506 in more detail.

A. Pre-Processor

In operation, the pre-processor 502 receives proximity-sensor data generated by one or more proximity-sensing systems (such as the proximity-sensing system discussed above in section (III)). Using the proximity-sensor data, the pre-processor 502 generates training data.

The pre-processor 502 can receive proximity-sensor data that is generated as part of a training process. In an implementation, the training process involves collecting proximity-sensor data of a single HMD while the HMD is being worn. In another implementation, the training process involves collecting proximity-sensor data from multiple HMDs while the HMDs are being worn. In these implementations, the training process can involve a single person or multiple persons wearing each of the HMDs.

Once collected, the proximity-sensor data can be pre-processed manually, automatically, or in both ways. Accordingly, the pre-processor 502 represents a manual process, a machine-implemented process, or both, depending on the desired implementation. In an implementation, a manual process performs part of the pre-processing, and a machine-implemented process performs the remainder. In another implementation, a manual process performs all of the pre-processing, and the fully pre-processed data is provided to the machine-learning system 504. In this implementation, the pre-processor 502 need not include any machine-implemented functionality. In another implementation, a machine-implemented process performs all of the pre-processing.

In an implementation, the pre-processing involves analyzing the proximity-sensor data to identify positive data samples (those containing data that corresponds to an eye gesture) and negative data samples (those containing data that does not correspond to an eye gesture). Then, in this implementation, the pre-processing involves separating the proximity-sensor data into multiple portions. In this implementation, the multiple portions constitute the training data.

In the training data, each of the portions can have a time window of a common duration. The duration of the time window can depend on the type of eye gesture of interest. For example, if the eye gesture of interest is a regular blink, then the time window could be set at 500 milliseconds, whereas if the eye gesture of interest is a long blink, then the time window could be set at 1,500 milliseconds.

The pre-processing can also involve applying a statistical analysis to the portions of the training data. To this end, the portions can be filtered based on statistical values such as the median absolute deviation (MAD) value, the median-to-MAD ratio, and so on. Note that various other types of statistical analysis can be applied to the training data.

The pre-processing can also involve normalizing a frame rate of the training data. Frame-rate normalization can be useful when a machine-learning process (to be discussed) assumes a constant frame rate. To perform frame-rate normalization, the pre-processing can use any suitable process, such as, for example, linear interpolation.

Figure 6:
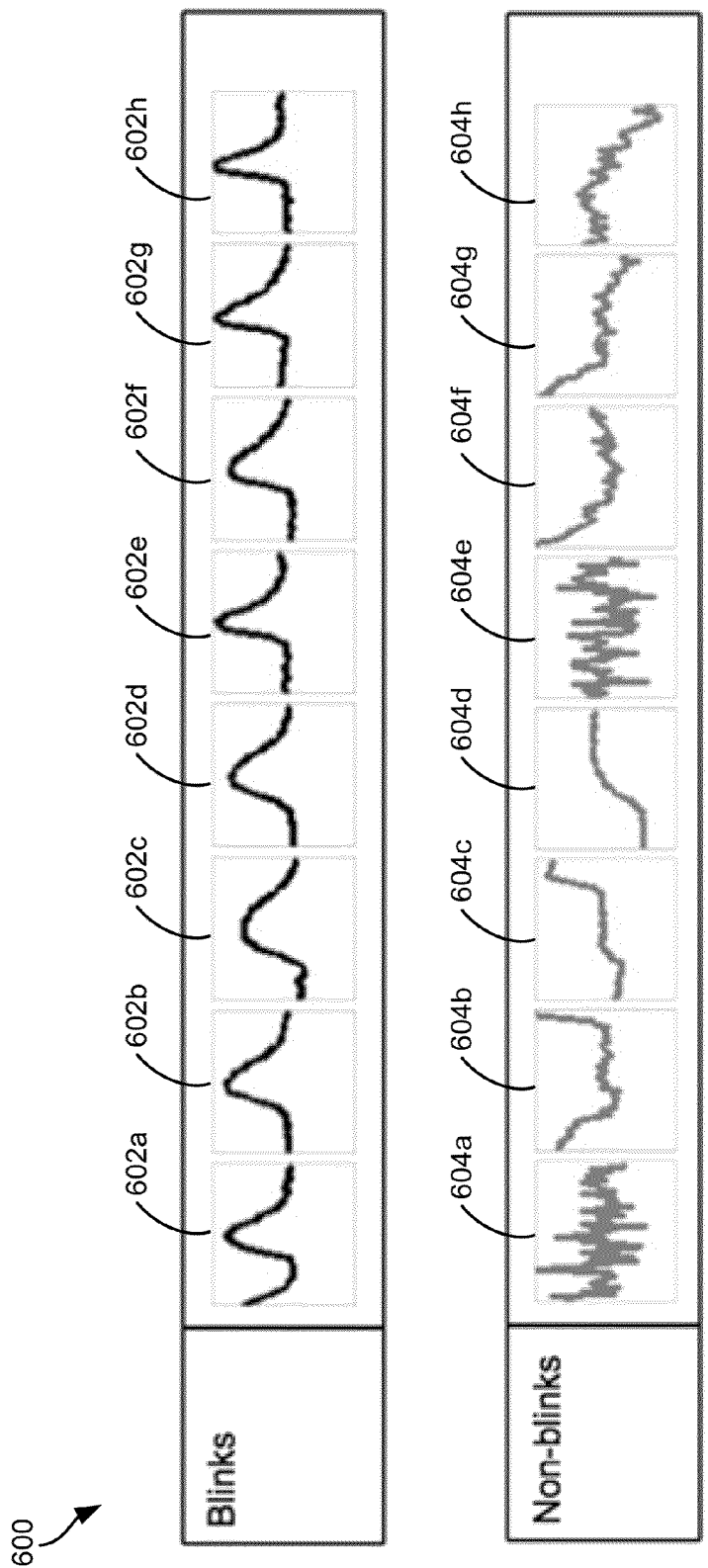
FIG. 6 illustrates an example of training data.

FIG. 6 illustrates an example of training data 600. As shown in FIG. 6, the training data 600 includes positive data samples 602a-602h, which correspond to a blink, and negative data samples 604a-604h, which do not correspond to a blink. Note that each of the positive data samples 602a-602h includes a "peak" pattern, characterized by a relatively low intensity, followed by increasing intensity over time, followed by decreasing intensity over time. It is this peak pattern that indicates that the positive data samples 602a-602h should be categorized as positives data samples in the first place. In contrast, note that the negative data samples 604a-604h are lacking the peak pattern.

For ease of explanation, FIG. 6 shows the training data 600 to include a relatively small number of samples. Of course, in practice, training data can include a larger number of samples.

B. Machine-Learning System

In operation, the machine-learning system 504 can use training data to learn a discriminative model. To this end, the machine-learning system 504 can use any suitable machine-learning process. For example, the machine-learning process can include a supervised learning model such as a support vector machine (SVM), a boosting process such as AdaBoost, a statistical model such as a hidden Markov model (HMM), or a combination of these, among others.

As an example, the machine-learning system 504 can apply a machine-learning approach that is similar to the approach discussed in "Rapid Object Detection using a Boosted Cascade of Simple Features", Paul Viola and Michael Jones, IEEE Conf. on Computer Vision and Pattern Recognition (CVPR), 2001 (referred to herein as "Viola-Jones method"), the entirety of which is hereby incorporated by reference herein. To this end, the machine-learning system 504 can apply a machine-learning process that combines three concepts: (1) Haar-features, (2) a boosting process, and (3) a cascaded classifier to efficiently combine many features. These concepts are discussed below in more detail.

1. Haar Features

A Haar feature (also called "Haar-like feature") is a feature used for object recognition. The Viola-Jones method uses two-dimensional Haar features in the form of adjacent rectangles, sums the pixel intensities in each region, and calculates the difference between these sums.

Similarly, the machine-learning system 504 can use Haar features to capture a pattern of positive data samples in the training data. As the training data derived from the proximity-sensor data typically involves one-dimensional signals, the machine-learning system 504 can use one-dimensional Haar features.

Figure 7:
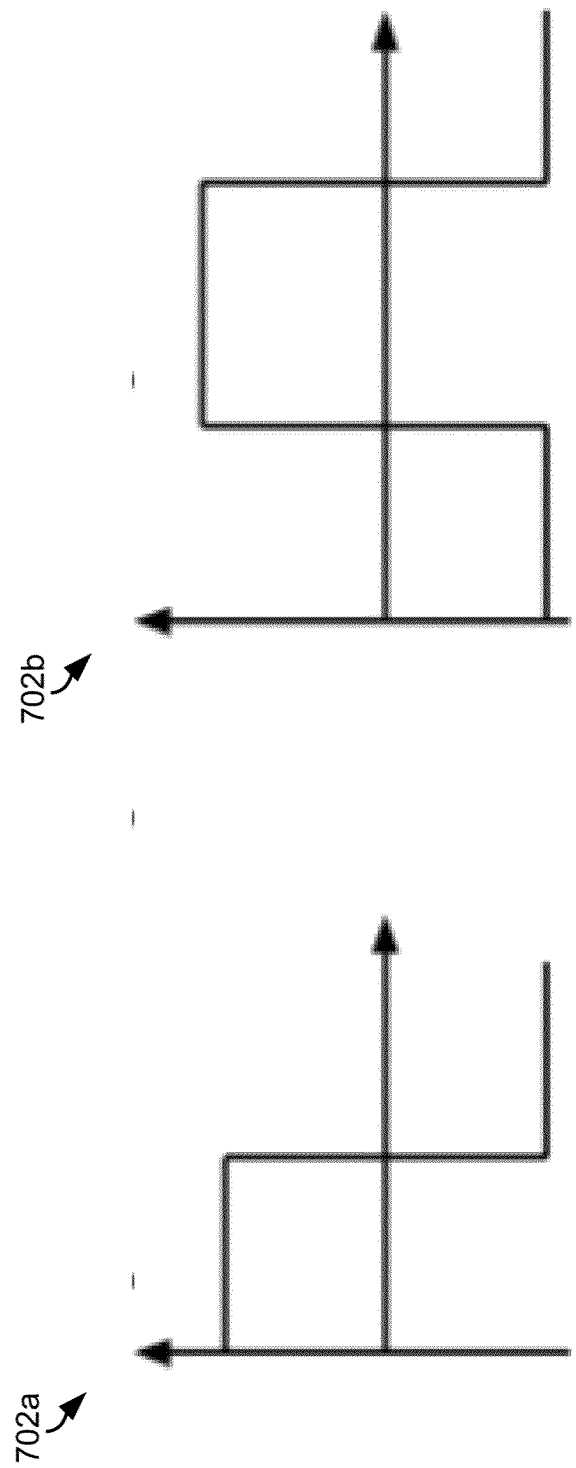
FIG. 7 illustrates examples of one-dimensional Haar features.

FIG. 7 shows an example of one-dimensional Haar features 702a-702b. Note that each of the Haar features 702a-702b includes a positive range and at least one negative range. In particular, the Haar feature 702a includes a positive range, followed by a negative range. And the Haar feature 702b includes a negative range, followed by a positive range, followed by a negative range. The Haar features 702a-702b can be used to detect a peak pattern in positive data samples that correspond to a blink. To this end, each of the Haar features 702a-702b is applied to each of the data samples.

For the sake of example, assume that the Haar feature 702a is being applied to a given data sample. Applying the Haar feature 702a to the data sample involves averaging values of the data sample in the positive range of the Haar feature 702a, and averaging values of the data sample in the negative range of the Haar feature 702a. Then, the averaged value of the negative range is subtracted from the averaged value of the positive range. If the difference exceeds a threshold (which can be set during learning), then the Haar feature is said to be present in the data sample.

In addition, the machine-learning system 504 can use an integral signal to more efficiently compute the presence or absence of many Haar features at every location in each of the data samples. In general, the integral signal contains the sum of small units of a given data sample. For example, an integral signal $ii(x)$, can be represented as follows: $ii(x)=\Sigma_{x' \leq x}i(x')$, where $i(x)$ is the original image.

2. Boosting Process

To select specific Haar features to use, and to set threshold levels, the Viola-Jones method uses a machine-learning process called AdaBoost. In general, AdaBoost combines many weak classifiers to create one strong classifier. A weak classifier is one that typically gets the right answer a little more often than random guessing would. By itself, a weak classifier is not often very useful. But when combined, several weak classifiers can each, in essence, "push" the final answer a bit in the correct direction, effectively functioning in concert as a strong classifier. AdaBoost selects a set of weak classifiers to combine and assigns a weight to each. This weighted combination is called the strong classifier.

The machine-learning system 504 can use such a boosting process to set threshold levels and to select specific Haar features to use. An example of a boosting process, which is similar to the AdaBoost process, is now discussed in more detail as applied to the training data. First, the boosting process receives training data samples $(x_1, y_1), \ldots, (x_n, y_n)$. Then, the boosting process initializes weights $w_{1,i}$ as follows:

$$w_{1,i} = \frac{1}{2m}, \frac{1}{2l}$$

for $y_i=0, 1$, respectively, where m and l are the number of negative and positive data samples, respectively. Then, the machine-learning process involves performing the following five steps for $t=1, \ldots, T$. First, normalize the weights as follows so that $w_t$ is a probability distribution:

$$w_{t,i} \leftarrow \frac{w_{t,i}}{\sum_{j=1}^{n} w_{t,j}}.$$

Second, for each feature, j, train a weak classifier, $h_j$, which is restricted to using a single feature. The weak classifier $h_j$ is represented as follows:

$$h_j(x) = \begin{cases} 1 & \text{if } p_j f_j(x) < p_j \theta_j \\ 0 & \text{otherwise} \end{cases},$$

where $f_j$ represents a feature, $\theta_j$ represents a threshold, and x represents a processed proximity-sensor data sample.

Third, evaluate the error, $\epsilon_j$, as follows: $\epsilon_j = \Sigma_i w_i |h_j(x_i) - y_i|$.
Fourth, choose the classifier, $h_t$, with the lowest error $\epsilon_j$.
Fifth, update the weights, $w_{t+1,i}$, as follows: $w_{t+1,i} = w_{t,i} \beta_t^{1-e_i}$, where $e_i = 0$ if example $x_i$ is classified correctly, $e_i = 1$ otherwise, and $$\beta_t = \frac{\epsilon_t}{1 - \epsilon_t}.$$

The resulting strong classifier, h(x), is represented as follows $$h(x) = \begin{cases} 1 & \sum_{t=1}^{T} \alpha_t h_t(x) \geq \frac{1}{2} \sum_{t=1}^{T} \alpha_t \\ 0 & \text{otherwise} \end{cases}, \text{ where } \alpha_t = \log \frac{1}{\beta_t}.$$

3. Cascaded Classifier

Figure 8:
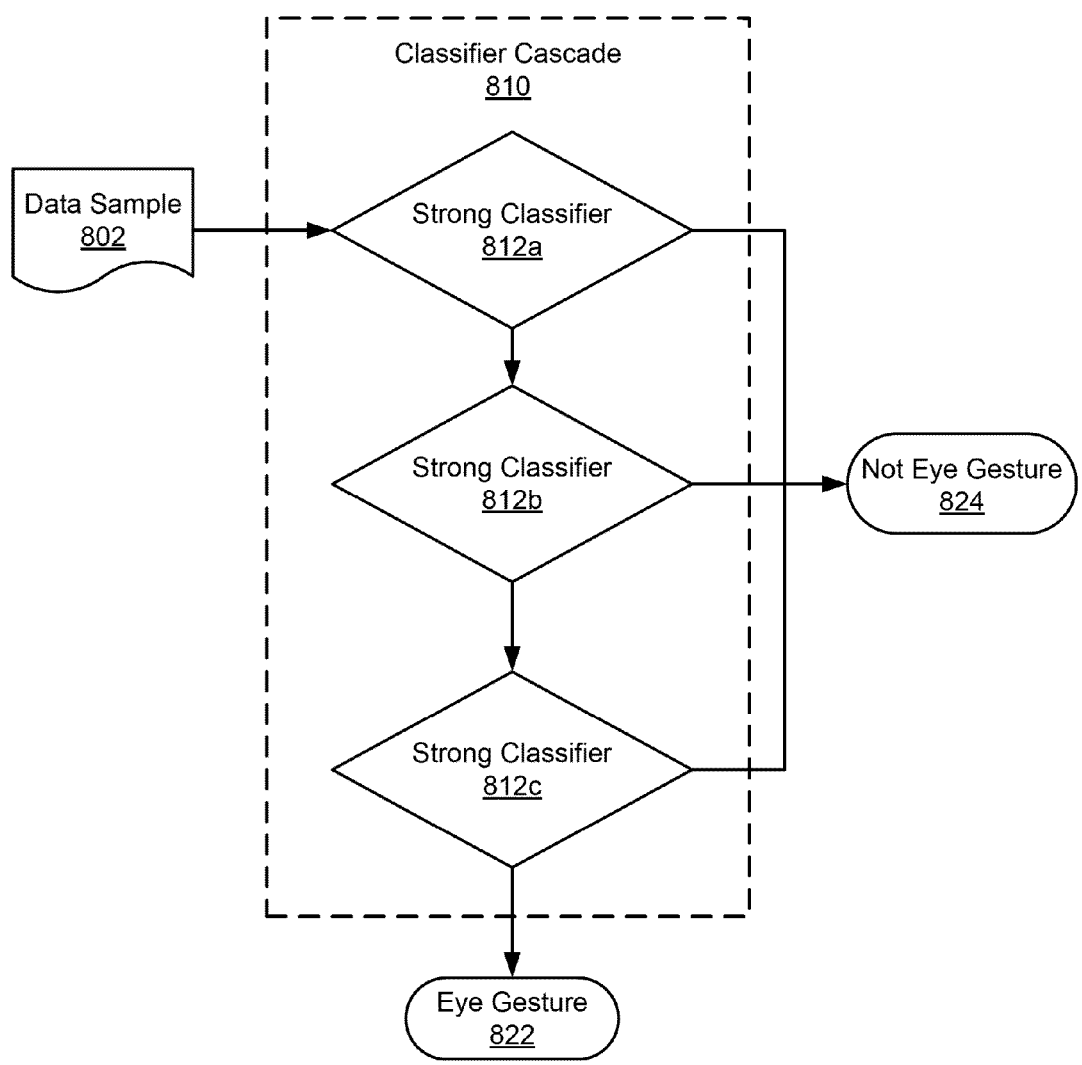
FIG. 8 illustrates an example of a classifier cascade.

As in the Viola-Jones method, the machine-learning system 504 can combine several strong classifiers into a classifier cascade. FIG. 8 illustrates an example of a classifier cascade 810. As shown in FIG. 8, the classifier cascade 810 contains three strong classifiers 812a-812c arranged in series. Each of the strong classifiers 812a-812c can be generated using any suitable machine-learning process, such as, for example, the boosting process discussed above in section (V)(B)(2), among others. Thus, in an implementation, the cascade of filters can include several strong classifiers, with each strong classifier containing a linear combination of weighted weak classifiers.

In some implementations, the order of the strong classifiers 812a-812c in the cascade 810 is based on the weighting that the machine-learning process assigns. In an implementation, the more heavily weighted strong classifiers come first, to eliminate data samples that do not correspond to an eye gesture as quickly as possible.

In operation, the strong classifier 812a of the classifier cascade 810 receives a data sample 802 and classifies the data sample 802 as an eye gesture or as not an eye gesture. If the data sample 802 is classified as an eye gesture, then the strong classifier 812a passes the data sample to the next strong classifier 812b. Otherwise, the strong classifier 812a rejects the data sample. The strong classifiers 812b and 812c perform the same process. If the data sample 802 successfully passes through all three strong classifiers 812a-812c, then the classifier cascade 810 classifies the data sample 802 as an eye gesture. Otherwise, the classifier cascade rejects the data sample 802.

C. Post-Processor

In some implementations, after applying the machine-learning system 504 to the training data, some post-processing can be performed in order to reduce an error rate. To this end, the post-processor 506 can perform any suitable form of post-processing. As an example, the post-processing can involve grouping together positive data samples that are close to one another in time, and classify only clusters with more than a minimum number of members as confident detections. The confident detections can then be filtered based on properties of recent confident detections. For instance, the post-processing can involve determining whether the peak height of a new confident blink detection is similar to a median peak height of a recent confident blink detection.

VI. Method for Generating an Eye-Gesture Model

Figure 9:
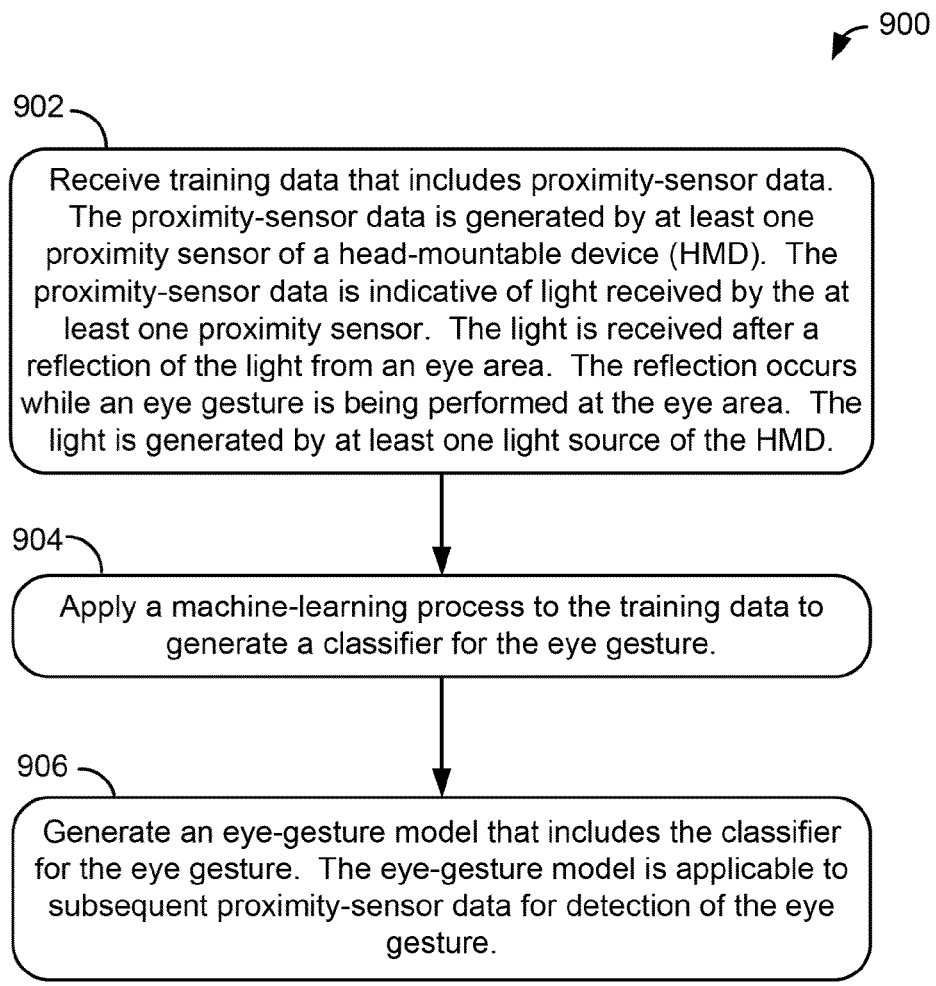
FIG. 9 illustrates an example of a method for generating an eye-gesture model.

FIG. 9 illustrates an example of a method 900 for generating an eye-gesture model. At block 902, the method 900 involves receiving training data that includes proximity sensor data. The proximity-sensor data is generated by at least one proximity sensor of a head-mountable device (HMD). The proximity-sensor data is indicative of light received by the at least one proximity sensor. The light is received by the at least one proximity sensor after a reflection of the light from an eye area. The reflection occurs while an eye gesture is being performed at the eye area. The light is generated by at least one light source of the HMD.

As mentioned above, the training data includes proximity sensor data. The proximity sensor data can be unprocessed or pre-processed. For example, a proximity sensor can generate data in response to the proximity sensor receiving light. In this example, the method 900 can involve receiving the unprocessed data directly from the proximity sensor. And in this example, the training data includes proximity sensor data in the form of the unprocessed data. As another example, a proximity sensor can generate data in response to the proximity sensor receiving light. The proximity sensor can then transmit the data to a pre-processor, which can pre-process the data. In this example, the method 900 can involve receiving the pre-processed data from the pre-processor. And in this example, the training data includes proximity sensor data in the form of the pre-processed data. Of course, the training data can include a combination of unprocessed and pre-processed proximity-sensor data.

Note that the training data can include proximity-sensor data from multiple proximity-sensing systems. Accordingly, in an implementation, the training data can include proximity-sensor data from a system of a first HMD, as well as proximity-sensor data from a system of a second HMD. In another implementation, the training data can include proximity-sensor data from multiple proximity-sensing systems of a given HMD. For example, an HMD can be equipped with two proximity-sensing systems: a first proximity-sensing system that is capable of performing proximity sensing at a wearer's left eye, and a second proximity-sensing system that is capable of performing proximity sensing at the wearer's right eye. In this implementation, the training data can include proximity-sensor data from both of the proximity-sensing systems.

At block 904, the method 900 involves applying a machine-learning process to the training data to generate at least one classifier for the eye gesture. In an implementation, the machine-learning process includes a boosting process, such as, for example, AdaBoost. In addition, the machine-learning process can involve the application of multiple Haar features to the training data. Note that the method 900 can involve the use of another type of machine-learning process. For example, the machine-learning process can include a supervised learning model such as a support vector machine (SVM), a statistical model such as a hidden Markov model (HMM), or a combination of these, among others.

At block 906, the method 900 involves generating an eye-gesture model that includes the at least one classifier for the eye gesture. The eye-gesture model is applicable to subsequent proximity-sensor data for detection of the eye gesture. In an implementation, the eye-gesture model contains a single classifier, such as, for example, a strong classifier that contains a linear combination of weak classifiers. In another implementation, the eye-gesture model includes multiple classifiers. For example, the eye-gesture model can include a classifier cascade, such as the classifier cascade 810 discussed above in connection with FIG. 8. When the eye-gesture model includes multiple classifiers, the classifiers can be arranged in a logically coupled configuration, such as the configuration of classifiers 812a-812c shown in FIG. 8.

The eye-gesture model can contain one or more classifiers for any type of eye gesture. Examples of eye gestures include a wink, a reflexive blink, a non-reflexive blink, a squint, and a change in gaze direction, among others. In addition, the eye-gesture model can involve one or more classifiers for a combination of eye gestures. As an example, the combination of eye gestures can be a double blink, a blink followed by a change in gaze direction, or a squint followed by a blink, among many other combinations of eye gestures.

In addition, the eye-gesture model can involve detecting a type of eye gesture that has a duration in a predetermined range. To this end, the eye-gesture model can contain one or more classifiers that can classify a given type of eye gesture that has a duration in a range as a positive sample, but can classify the type of eye gesture as a negative sample when it has a duration outside the range. For example, the eye-gesture model can involve detecting only wink gestures having a duration in a predetermined range. In this way, the eye-gesture model can be used to detect longer blinks (which can correspond to non-reflexive blinks) without detecting shorter blinks (which can correspond to reflexive blinks)

VII. Method for Detecting an Eye Gesture

Figure 10:
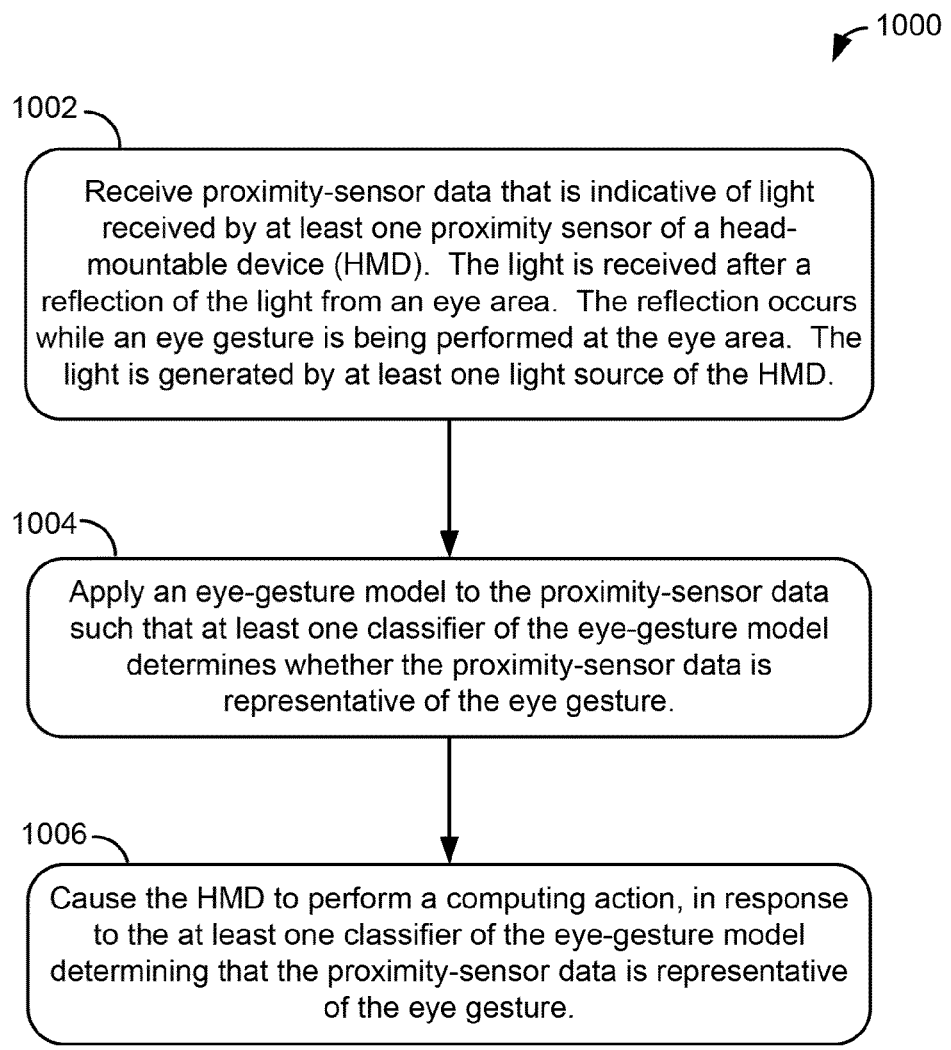
FIG. 10 illustrates an example of a method for detecting an eye gesture.

FIG. 10 illustrates an example of a method 1000 for detecting an eye gesture. At block 1002, the method 1000 involves receiving proximity-sensor data that is indicative of light received by at least one proximity sensor of a head-mountable device (HMD). The light is received after a reflection of the light from an eye area. The reflection occurs while an eye gesture is being performed at the eye area. The light is generated by at least one light source of the HMD.

The proximity-sensor data can be unprocessed or pre-processed. For example, a proximity sensor can generate data in response to the proximity sensor receiving light. In this example, the method 1000 can involve receiving the unprocessed data directly from the proximity sensor. In this example, the proximity-sensor data is in the form of the unprocessed data. As another example, a proximity sensor can generate data in response to the proximity sensor receiving light. The proximity sensor can then transmit the data to a pre-processor, which can pre-process the data. In this example, the method 1000 can involve receiving the pre-processed data from the pre-processor. And in this example, the proximity-sensor data is in the form of the pre-processed data. Of course, the training data can include a combination of unprocessed and pre-processed proximity sensor data.

At block 1004, the method 1000 involves applying an eye-gesture model to the proximity-sensor data such that at least one classifier of the eye-gesture model determines whether the proximity-sensor data is representative of the eye gesture. For example, with reference to FIG. 8 (discussed above in section (V)(B)(3)), an eye-gesture model can contain the classifier cascade 810. In this example, the eye-gesture model can be applied to proximity-sensor data such that the classifier cascade 810 determines whether the proximity-sensor data is representative of a given eye gesture.

At block 1006, the method 1000 involves causing the HMD to perform a computing action, in response to the at least one classifier of the eye-gesture model determining that the proximity-sensor data is representative of the eye gesture. In some implementations, the method 1000 involves causing the HMD to perform multiple computing actions, in response to the at least one classifier of the eye-gesture model determining that the proximity-sensor data is representative of the eye gesture.

The computing action can be any function that is executable by the HMD or by a computing system that is connected to the HMD. For example, the computing action can involve causing an image capture device to capture image data. In an implementation, the image capture device can be, for example, a camera, such as a front-facing camera, of the HMD. In another implementation, the image capture device can be a camera that is separate from the HMD and in communication with the HMD. Other examples of computing actions include (1) activating, deactivating, or modifying an interface, such as a voice command interface of the HMD; (2) detecting a face in an image; (3) detecting an object in an image; (4) recording a video using a camera of the HMD; (5) displaying a video using a display of the HMD; (6) sending an image as an e-mail; (7) sending an image to a social network; (8) sending information to another device, such as a mobile phone or another HMD; (9) activating or de-activating the HMD itself; (10) activating or de-activating a display of an HMD; (11) modifying information provided in a display of an HMD; (12) using an HMD to activate, deactivate, or modify an external device, such as an external camera or display; (13) selecting a computing action to perform, and (14) any combination of these or other types of computing actions.

VIII. Computing Device

Figure 11:
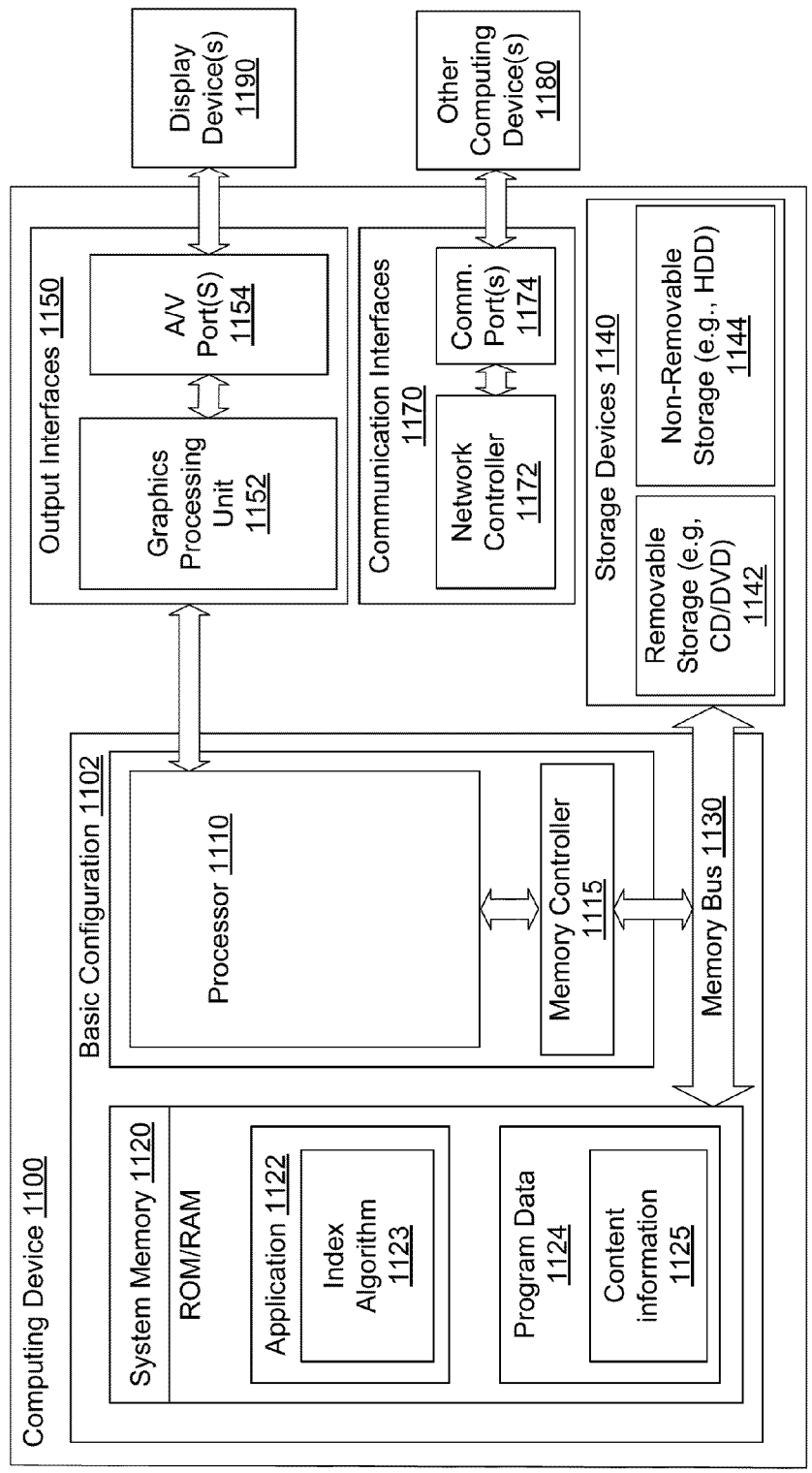
FIG. 11 illustrates an example of a computing device.

FIG. 11 illustrates a functional block diagram of an example of a computing device 1100. The computing device 1100 can be used to perform any of the functions discussed in this disclosure, including those functions discussed above in connection with FIGS. 9 and 10.

In an implementation, the computing device 1100 can be implemented as a portion of a head-mountable device, such as, for example, any of the HMDs discussed above in connection with FIGS. 1A-1D. In another implementation, the computing device 1100 can be implemented as a portion of a small-form factor portable (or mobile) electronic device that is capable of communicating with an HMD; examples of such devices include a cell phone, a personal data assistant (PDA), a personal media player device, a wireless web-watch device, an application specific device, or a hybrid device that include any of the above functions. In another implementation, the computing device 1110 can be implemented as a portion of a computer, such as, for example, a personal computer, a server, or a laptop, among others.

In a basic configuration 1102, the computing device 1100 can include one or more processors 1110 and system memory 1120. A memory bus 1130 can be used for communicating between the processor 1110 and the system memory 1120. Depending on the desired configuration, the processor 1110 can be of any type, including a microprocessor (μP), a microcontroller (μC), or a digital signal processor (DSP), among others. A memory controller 1115 can also be used with the processor 1110, or in some implementations, the memory controller 1115 can be an internal part of the processor 1110.

Depending on the desired configuration, the system memory 1120 can be of any type, including volatile memory (such as RAM) and non-volatile memory (such as ROM, flash memory). The system memory 1120 can include one or more applications 1122 and program data 1124. The application(s) 1122 can include an index algorithm 1123 that is arranged to provide inputs to the electronic circuits. The program data 1124 can include content information 1125 that can be directed to any number of types of data. The application 1122 can be arranged to operate with the program data 1124 on an operating system.

The computing device 1100 can have additional features or functionality, and additional interfaces to facilitate communication between the basic configuration 1102 and any devices and interfaces. For example, data storage devices 1140 can be provided including removable storage devices 1142, non-removable storage devices 1144, or both. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives. Computer storage media can include volatile and nonvolatile, non-transitory, removable and non-removable media implemented in any method or technology for storage of information, such as computer readable instructions, data structures, program modules, or other data.

The system memory 1120 and the storage devices 1140 are examples of computer storage media. Computer storage media includes, but is not limited to, RAM, ROM, EEPROM, flash memory or other memory technology, CD-ROM, DVDs or other optical storage, magnetic cassettes, magnetic tape, magnetic disk storage or other magnetic storage devices, or any other medium that can be used to store the desired information and that can be accessed by the computing device 1100.

The computing device 1100 can also include output interfaces 1150 that can include a graphics processing unit 1152, which can be configured to communicate with various external devices, such as display devices 1190 or speakers by way of one or more A/V ports or a communication interface 1170. The communication interface 1170 can include a network controller 1172, which can be arranged to facilitate communication with one or more other computing devices 1180 over a network communication by way of one or more communication ports 1174. The communication connection is one example of a communication media. Communication media can be embodied by computer-readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR), and other wireless media.

Figure 12:
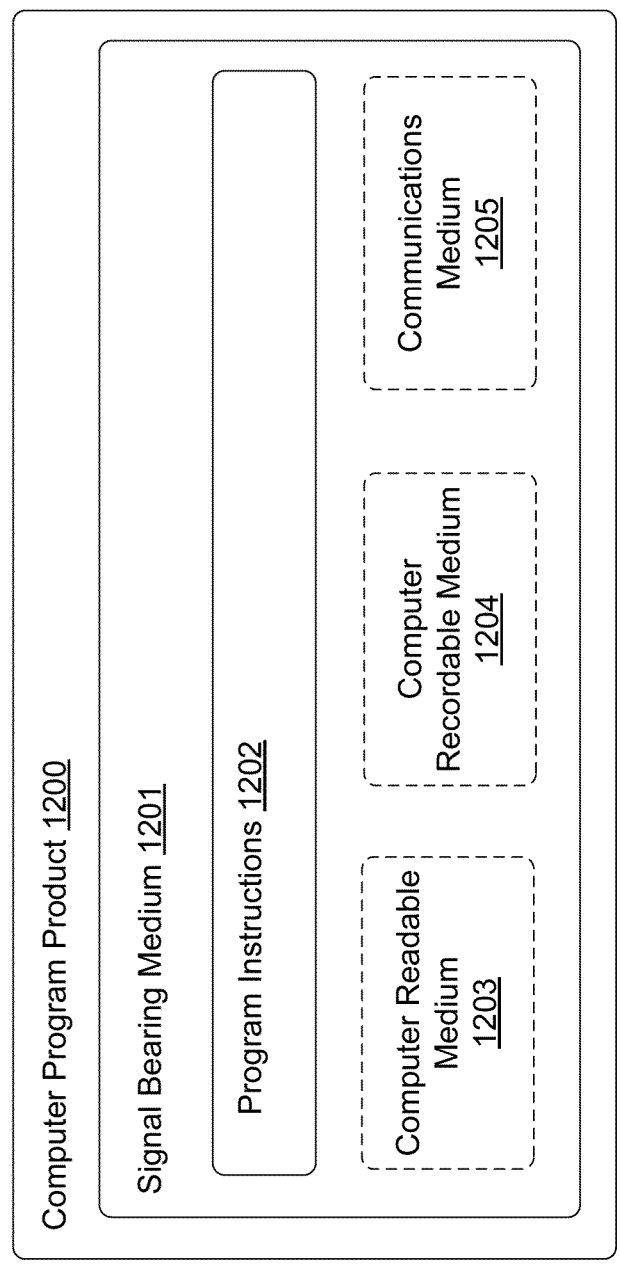
FIG. 12 illustrates an example of a computer program product.

The disclosed methods can be implemented as computer program instructions encoded on a non-transitory computer-readable storage medium in a machine-readable format, or on other non-transitory media or articles of manufacture. FIG. 12 illustrates a conceptual example of a computer program product 1200 that includes a computer program for executing a computer process on a computing device.

The computer program product 1200 is provided using a signal bearing medium 1201. The signal bearing medium 1201 can include one or more programming instructions 1202 that, when executed by one or more processors, can provide functionality or portions of the functionality discussed above. In some implementations, the signal bearing medium 1201 can encompass a computer-readable medium 1203 such as, but not limited to, a hard disk drive, a CD, a DVD, a digital tape, or memory. In some implementations, the signal bearing medium 1201 can encompass a computer-recordable medium 1204 such as, but not limited to, memory, read/write (R/W) CDs, or R/W DVDs. In some implementations, the signal bearing medium 1201 can encompass a communications medium 1205 such as, but not limited to, a digital or analog communication medium (for example, a fiber optic cable, a waveguide, a wired communications link, or a wireless communication link). Thus, for example, the signal bearing medium 1201 can be conveyed by a wireless form of the communications medium 1205 (for example, a wireless communications medium conforming with the IEEE 802.11 standard or other transmission protocol).

The one or more programming instructions 1202 can be, for example, computer executable or logic implemented instructions. A computing device (such as the computing device 1100 of FIG. 11) can be configured to provide various operations, functions, or actions in response to the programming instructions 1202 conveyed to the computing device by one or more of the computer-readable medium 1203, the computer recordable medium 1204, and the communications medium 1205.

IX. Concluding Remarks

While various aspects and embodiments have been disclosed herein, other aspects and embodiments will be apparent to those skilled in the art. The various aspects and embodiments disclosed herein are for purposes of illustration and are not intended to be limiting, with the true scope and spirit of the present invention being indicated by the following claims.

We claim:

1. A method comprising:
receiving training data that includes proximity-sensor data, wherein the proximity-sensor data is generated by at least one inward-facing proximity sensor of a head-mountable device (HMD), wherein the at least one proximity sensor is directed towards a side of an eye, wherein the proximity-sensor data is indicative of light received by the at least one proximity sensor after a reflection of the light from an eye area, wherein at least a substantial portion of the eye area is constituted by skin at the side of the eye that wrinkles when an eye gesture of the eye occurs, and wherein the light is generated by at least one light source of the HMD;
applying a machine-learning process to the training data to generate at least one one-dimensional classifier for the eye gesture; and
generating an eye-gesture model that includes the at least one one-dimensional classifier for the eye gesture, wherein the eye-gesture model is applicable to subsequent proximity-sensor data for detection of the eye gesture based on subsequent proximity-sensor data corresponding to wrinkles in the skin at the side of the eye.

2. The method of claim 1, wherein the machine-learning process comprises boosting process.

3. The method of claim 1, wherein the machine-learning process comprises applying a plurality of Haar features to the training data.

4. The method of claim 1, wherein the eye-gesture model includes one or more other classifiers, and wherein the eye-gesture model arranges the one-dimensional classifier and the one or more other one-dimensional classifiers in a coupled manner.

5. The method of claim 1, wherein the proximity-sensor data is generated in response to one or more of the at least one proximity sensor receiving the light.

6. The method of claim 1, wherein the training data comprises proximity-sensor data generated at another HMD.

7. The method of claim 1, wherein the eye gesture includes a blink having a duration in a predetermined range.

8. A non-transitory computer-readable medium having stored thereon program instructions that, upon execution by a computing device, cause the computing device to perform functions comprising:
receiving training data that includes proximity-sensor data, wherein the proximity-sensor data is generated by at least one inward-facing proximity sensor of a head-mountable device (HMD), wherein the at least one proximity sensor is directed towards a side of an eye, wherein the proximity-sensor data is indicative of light received by the at least one proximity sensor after a reflection of the light from an eye area, wherein at least a substantial portion of the eye area is constituted by skin at side of the eye area wrinkles when an eye gesture of the eye occurs, and wherein the light is generated by at least one light source of the HMD;
applying a machine-learning process to the training data to generate at least one one-dimensional classifier for the eye gesture; and
generating an eye-gesture model that includes the at least one one-dimensional classifier for the eye gesture, wherein the eye-gesture model is applicable to subsequent proximity-sensor data for detection of the eye gesture based on subsequent proximity-sensor data corresponding to wrinkles in the skin at the side of the eye.

9. The medium of claim 8, wherein the machine-learning process comprises a boosting process.

10. The medium of claim 8, wherein the machine-learning process comprises applying a plurality of one-dimensional Haar features to the training data.

11. The medium of claim 8, wherein the eye-gesture model includes one or more other one-dimensional classifiers, and wherein the eye-gesture model arranges the one-dimensional classifier and the one or more other one-dimensional classifiers in a coupled manner.

12. The medium of claim 8, wherein the proximity-sensor data is generated in response to one or more of the at least one proximity sensor receiving the light.

13. The medium of claim 8, wherein the training data comprises proximity-sensor data generated at another HMD.

14. The medium of claim 8, wherein the eye gesture includes a blink having a duration in a predetermined range.

15. A method comprising:
receiving proximity-sensor data that is indicative of light received by at least one inward-facing proximity sensor of a head-mountable device (HMD), wherein the at least one proximity sensor is directed towards a side of an eye, wherein the proximity-sensor data is indicative of light received by the at least one proximity sensor after a reflection of the light from an eye area, wherein at least a substantial portion of the eye area is constituted by wherein the reflection occurs while skin at the side of the eye that wrinkles when an eye gesture, and wherein the light is generated by at least one light source of the HMD;
applying an eye-gesture model to the proximity-sensor data such that at least one one-dimensional classifier of the eye-gesture model determines whether the proximity-sensor data is representative of the eye gesture based on proximity-sensor data corresponding to wrinkles in the skin at the side of the eye; and
in response to the at least one one-dimensional classifier of the eye-gesture model determining that the proximity-sensor data is representative of the eye gesture, causing the HMD to perform a computing action.

16. The method of claim 15, wherein the proximity-sensor data is generated in response to one or more of the at least one proximity sensor receiving the light.

17. The method of claim 15, wherein the eye gesture includes a blink having a duration in a predetermined range.

18. A head-mountable device (HMD) system comprising:
a proximity-sensor system, wherein the proximity-sensor system is configured to generate proximity-sensor data, wherein the proximity-sensor data is indicative of light received by at least one inward-facing proximity sensor of an HMD, wherein the at least one proximity sensor is directed towards a side of an eye, wherein the proximity-sensor data is indicative of light received by the at least one proximity sensor after a reflection of the light from an eye area, wherein at least a substantial portion of the eye area is constituted by skin at the side of the eye that wrinkles when an eye gesture of the eye occurs, and wherein the light is generated by at least one light source of the HMD; and
a computer-readable medium having stored thereon program instructions that, upon execution by a computing device, cause the computing device to perform functions comprising:
(i) applying an eye-gesture model to the proximity-sensor data such that at least one one-dimensional classifier of the eye-gesture model determines whether the proximity-sensor data is representative of the eye gesture based on proximity-sensor data corresponding to wrinkles in the skin at the side of the eye; and
(ii) in response to the at least one one-dimensional classifier of the eye-gesture model determining that the proximity-sensor data is representative of the eye gesture, causing the HMD to perform a computing action.

19. The HMD system of claim 18, wherein the proximity-sensor data is generated in response to one or more of the at least one proximity sensor receiving the light.

20. The HMD system of claim 18, wherein the eye gesture includes a blink having a duration in a predetermined range.

* * * * *